Feb. 16, 1943.  F. S. HODGMAN  2,310,954
BALANCED AUTOMATIC STEERING DEVICE
Filed July 26, 1939  2 Sheets-Sheet 1

INVENTOR
FREDERICK S. HODGMAN
HIS ATTORNEY

Feb. 16, 1943.  F. S. HODGMAN  2,310,954
BALANCED AUTOMATIC STEERING DEVICE
Filed July 26, 1939   2 Sheets-Sheet 2
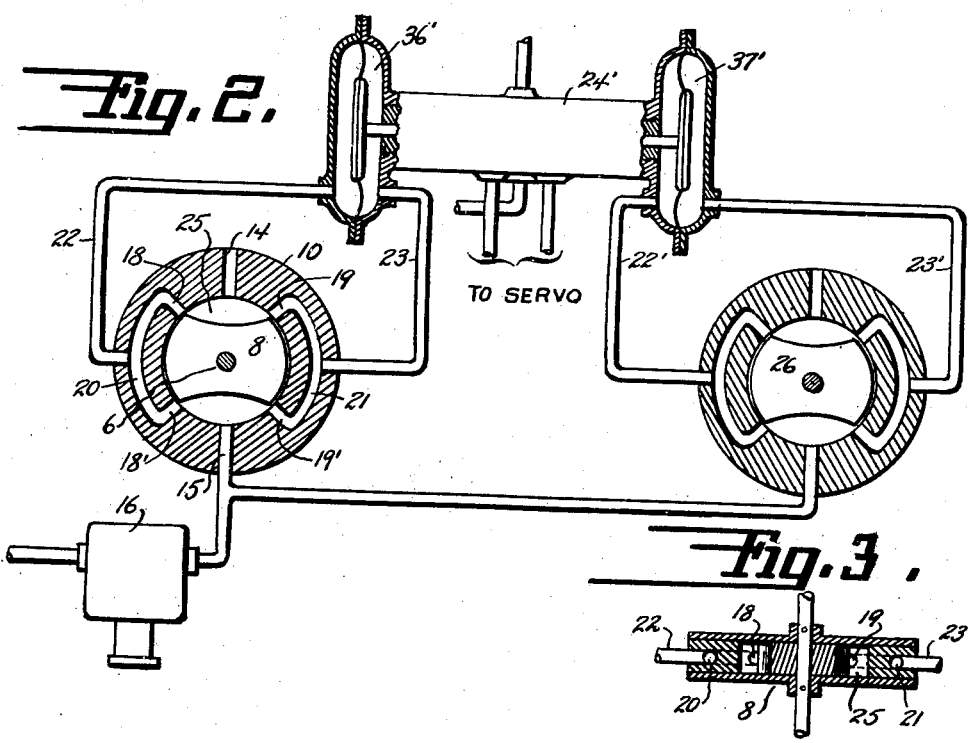
INVENTOR
FREDERICK S. HODGMAN
BY
Herbert H. Thompson
HIS ATTORNEY.

Patented Feb. 16, 1943

2,310,954

UNITED STATES PATENT OFFICE 2,310,954

BALANCED AUTOMATIC STEERING DEVICE

Frederick S. Hodgman, Glen Rock, N. J., assignor to Sperry Gyroscope Company, Inc., Brooklyn, N. Y., a corporation of New York Application July 26, 1939, Serial No. 286,534

20 Claims. (Cl. 244—78)

This invention relates to automatic steering devices for vehicles and especially for aircraft. More particularly, it relates to such devices in which a differential air flow pick-off is employed at the position maintaining instrument for controlling the rudder directly or indirectly.

One object of the invention is to eliminate the necessity for follow-back connections from the rudder or rudder servomotor to the control instrument, while at the same time retaining the advantages of the positional control of the rudder, that is, a control wherein the rudder is moved through an angle proportional to a function of the deviation of the craft from course.

According to my invention, I employ a differential air pick-off not only at the position maintaining instrument, but also a similar device positioned from the rudder, and the relay valve for controlling the rudder is governed by the combined or differential signal from the two pick-offs.

Referring to the drawings, showing several forms my invention may assume,

Fig. 2 shows a form similar to Fig. 1 except that the signals from the pick-offs are not mixed but are separately applied to the relay.

Fig. 3 is a section taken approximately on line 3—3 of Fig. 1.

Figure 1:
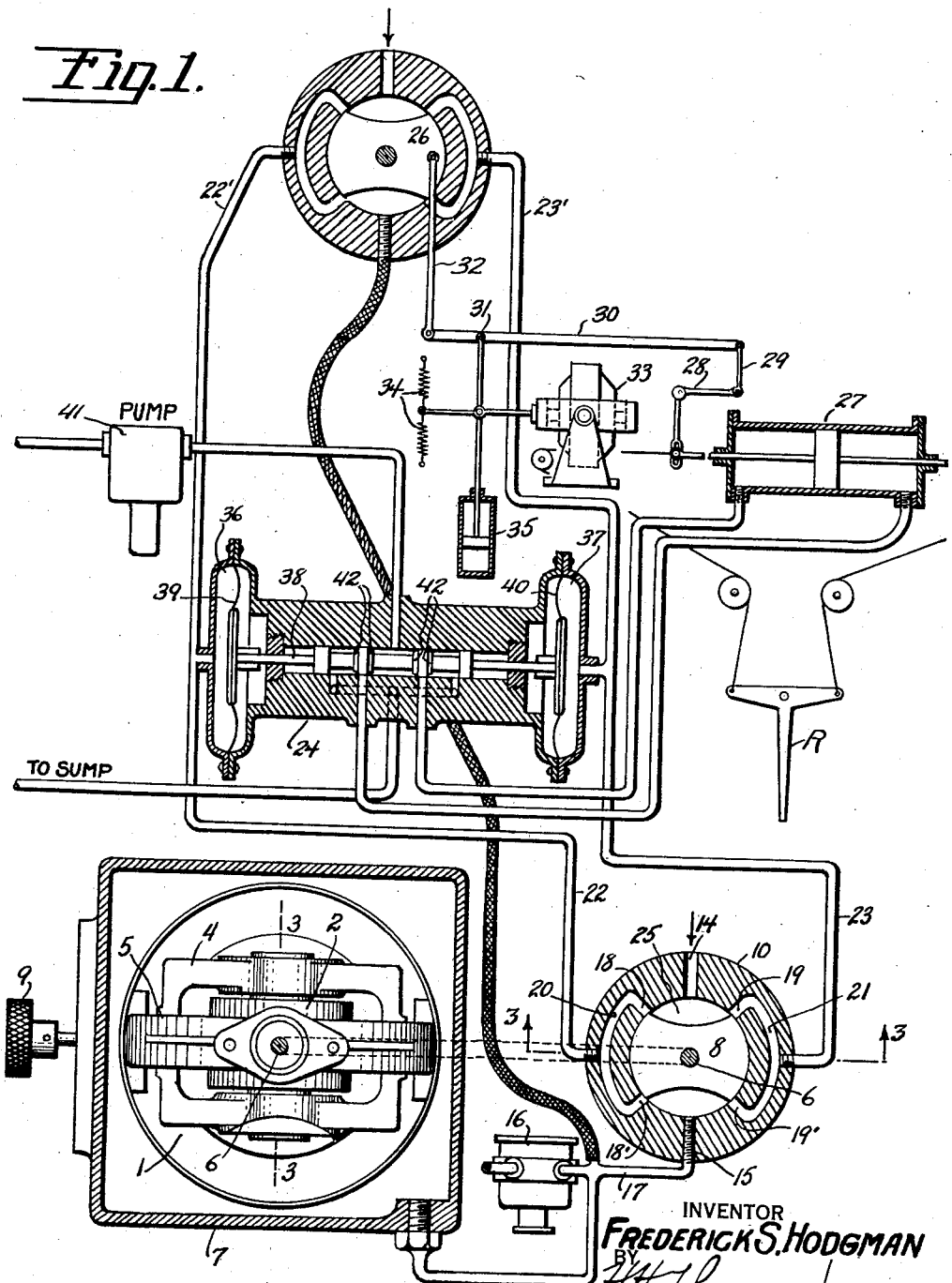
Fig. 1 is a diagrammatic plan view, partly in section, of my invention as applied to rudder control of an airplane.

While my invention is shown as applied to the steering of the aircraft in azimuth, it will be obvious that the same principles may be applied to the control of the craft about either or both of the other principal axes.

In Fig. 1, the control or position maintaining instrument is shown as a directional gyroscope 1, comprising a rotor 2 mounted for spinning on a horizontal axis 3—3 in the rotor bearing frame 4, which in turn is mounted for oscillation about a second horizontal axis in the vertical ring 5, the latter being mounted for turning in azimuth on a vertical shaft 6 journaled in the outer casing 7. The air pick-off from the directional gyroscope is shown as displaced to one side therefrom, but it will be understood that the cut-off plate or disc 8 is mounted directly above and on the upper vertical shaft 6 of the vertical ring. Course changes may be effected either by caging and resetting the gyroscope in the well known manner from the setting knob 9, or by turning the housing 10 of the plate 8 in azimuth as from a setting knob 11 (not shown).

The casing 10 for disc 8 is provided with an intake port 14 and an outlet port 15. If a vacuum system is employed, the vacuum pump 16 is connected to the outlet port through a pipe 17 and atmospheric air enters through the intake port 14 as represented by the arrow. The housing 10 is also provided with two pairs of connected ports 18, 18' and 19, 19', the members of each pair being connected through passages 20 and 21, which in turn are connected to pipes 22 and 23 leading to the relay valve 24.

The disc 8 is shown as provided with offset cut-out crescents so as to divide the chamber 25 within the housing 10 into two parts. The edges of the crescents normally bisect the four ports. It will be readily apparent that if the valve 8 moves slightly clockwise, for instance, the free passage of the air entering at 14 into the passage 21 will be increased. At the same time the exit of air through passage 19' will be decreased, thereby resulting in a rise in pressure in pipe 23. At the same time the passage of the air into passage 20 will be decreased and its exit increased, thereby decreasing the pressure in the pipe 22.

I place a similar pick-off valve 26 at the servomotor 27 for the rudder R or other control surface, and connect it to the same as by means of a bell crank lever 28, link 29, lever 30 pivoted at 31, and link 32. The movement of the valve 26 will therefore be proportional to the rudder movement. I may also differentially introduce an antihunt factor as by connecting the pivot 31 to a turn indicator type or rate of turn type gyroscope 33. This is shown as normally centralized by springs 34 and damped by a dashpot 35.

The valve 26 may be in all respects similar to the valve 8 and the pipes 22' and 23' leading therefrom may be joined to the pipes 22, 23, so that the mean of the signals from the two pick-offs is supplied to chambers 36 and 37 in the relay valve 24. By this means a proportional follow-back is secured without any mechanical connections between the rudder and the control instrument.

The relay is shown as of the pneumatic-hydraulic type in which the main piston valve 38 is moved primarily by the differential air pressure on the piston diaphragms 39 and 40 on the ends thereof, the piston valve controlling the flow of oil from the oil pump 41 to either end of the piston of servomotor 27. Preferably, the edges of the collars 42 on the piston valve are beveled so as to secure graduated control of the oil flow under pressure.

In Fig. 2, the system shown is quite similar except that instead of mixing the air signals from the two pick-offs, the air signals are kept separate and fed into the two sides of the pressure diaphragm chambers 36' and 37'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic steering device, the combination with a position maintaining means and a rudder, of a differential air flow pick-off valve mounted on and moved by said means, a second remotely located differential air flow valve moved in accordance with the movements of said rudder, and a rudder servo motor differentially controlled by said two valves and connected to said rudder and said second valve.

2. An automatic steering device as claimed in claim 1, in which said servo motor is of the hydraulic type and a pneumatic-hydraulic relay, subject to the output from both valves, is interposed between the servo motor and both said pick-off valves.

3. An automatic steering device as claimed in claim 1, having a rate of turn gyroscope differentially connected into at least one of said pick-off valves.

4. In a differential air flow position reproducing device, a valve housing having an intake and an outlet to the interior thereof, a rotary valve dividing the interior to separate the intake from the outlet and having opposite edges, a by-pass passage around each end of the valve and terminating in ports opening into said interior, said ports lying normally at the edges of the valve, a servo or relay device governed by differential air pressure, and pipes connecting said device to each of the said by-pass passages.

5. In an automatic steering device, the combination with a position maintaining means and a rudder, of a differential air flow pick-off device adjacent and connected to said means comprising a valve housing having an intake and an outlet connected to the interior thereof, a valve dividing the interior to separate the intake from the outlet and having opposite edges, a by-pass passage around each end of the valve terminating in ports opening into said interior, said ports lying normally at the edges of the valve, a second similar but remotely located differential air flow device moved in accordance with the movements of said rudder, and a rudder servo motor controlled by said two devices and connected to said rudder and said second valve.

6. In an automatic steering device for craft, the combination with a position-maintaining means, a rudder and a servo motor connected to said rudder, of signal producing means comprising a differential air flow pick-off valve mounted on and moved by said position-maintaining means, a second signal producing means comprising a second and remotely located differential air flow pick-off valve moved in accordance with movements of said rudder, means for differentially combining said signals to form a differential signal, and means for controlling said motor by said differential signal.

7. An automatic steering device as claimed in claim 6, in which said servo motor is a hydraulic motor, and in which said last-named control means includes a pneumatic-hydraulic relay subject to said differential signal and interposed between said motor and both said pick-off valves.

8. An automatic steering device as claimed in claim 6, further including a rate gyroscope differentially connected to at least one of said pick-off valves.

9. In an automatic fluid pressure control device for craft, the combination with a position maintaining means, a control element and a servo motor connected to said control element, of signal producing means comprising a pick-off valve mouted on said position maintaining means to be moved therewith, a second signal producing means comprising a second pick-off valve connected to be moved by said control element, and means for controlling said motor by both of said signals.

10. In an automatic fluid pressure control device for craft, the combination with a position maintaining means, a control element, and a servo motor connected to said element, of signal producing means comprising a pick-off valve mounted on said position maintaining means to be moved therewith, a second signal producing means comprising a second pick-off valve connected to be moved by said control element, means for combining said signals, and means for controlling said motor by said combined signals.

11. In an automatic control device for craft, the combination with a position maintaining means, a control element, and a servo motor connected to said control element, of signal producing means comprising an air flow pick-off valve mounted on and moved by said position-maintaining means, a second signal producing means comprising a second air flow pick-off valve connected to be moved by said control element, means for combining said signals, and means for controlling said motor by said combined signals.

12. In an automatic control device for a craft, the combination with a position maintaining means, a control element movable with respect to said craft, and a servo motor connected to move said element, of means for producing a differential signal in response to change in relative displacement of said position maintaining means with respect to said craft, means for producing a second differential signal in response to change in relative displacement of said element with respect to said craft, means for combining said signals, and means for controlling said motor by said combined signals.

13. In an automatic control device for a craft, the combination with a position maintaining means, a control element, and a servo motor connected to said control element, of means for producing a differential pressure in response to change in relative displacement of said position maintaining means with respect to said craft, means for producing a second differential pressure in response to change in relative displacement of said rudder with respect to said craft, and means for controlling said motor by said pressures.

14. In an automatic steering device for a craft, the combination with a position maintaining means, a rudder and a servo motor connected to said rudder, of means for producing differential pressure in response to change in relative displacement of said position-maintaining means with respect to said craft, means for producing a second differential pressure in response to change in relative displacement of said rudder with respect to said craft, means for combining said two differential pressures, and means for controlling said motor by said combined pressures.

15. In an automatic steering device for a craft, the combination with a position-maintaining instrument, a rudder and a hydraulic servo motor connected to said rudder, of means for producing a differential air pressure in response to change in relative displacement of said position maintaining means with respect to said craft, means for producing a second differential air pressure in response to change in relative displacement of said rudder with respect to said craft, means for combining said two differential air pressures, and means including a pneumatic-hydraulic relay controlled by said combined air pressures for controlling said hydraulic motor.

16. An automatic steering device as claimed in claim 14, further including a rate of turn gyroscope, and means for connecting said gyroscope to differentially control one of said pressure producing means.

17. An automatic control device as claimed in claim 13, in which said last-named means includes a relay valve having two control diaphragms, and means for controlling said diaphragms respectively by said differential pressures.

18. An automatic control device as claimed in claim 13, in which said last-named means includes a relay valve having diaphragm control means, means for combining said differential pressures, and means for actuating said diaphragm means by said combined pressures.

19. An automatic steering device as claimed in claim 11, in which each of said air-flow pick-off valves comprises a valve housing having an interior chamber, an air inlet duct leading to said chamber, an air outlet duct leading from said chamber, a rotary valve member dividing said chamber to separate said inlet from said outlet, two pairs of oppositely disposed pressure outlet ports formed in said housing, a passageway formed in said housing and connecting two unpaired ports, a similar passageway connecting the remaining two ports, and an external output pressure duct connecting to each of said passageways, said valve member having opposed pairs of edges, all edges being adapted in at least one position of said member to be disposed opposite respective ports.

20. In a differential air flow position reproducing device, a valve housing having an interior chamber, an air inlet duct leading to said chamber, an air output duct leading from said chamber, a rotary valve member dividing said chamber to separate said inlet from said output, said housing having formed therein two pairs of oppositely disposed pressure outlet ports, and a passageway joining each two unpaired ports, a device governed by differential pressure, an external outlet pressure duct connecting each passageway to said device, said valve member having edges adapted, in at least one position of said member, to be disposed respectively opposite said ports, and means for connecting said air outlet duct to a source of vacuum pressure.

FREDERICK S. HODGMAN.